(12) United States Patent
Kanahara et al.

(10) Patent No.: US 9,537,343 B2
(45) Date of Patent: Jan. 3, 2017

(54) ELECTRIC POWER TRANSMISSION APPARATUS FOR VEHICLE

(71) Applicant: HONDA MOTOR CO., LTD., Tokyo (JP)

(72) Inventors: Hirokazu Kanahara, Haga-gun (JP); Motohisa Hirose, Haga-gun (JP); Takashi Azegami, Utsunomiya (JP); Yuji Yokota, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 520 days.

(21) Appl. No.: 14/052,868

(22) Filed: Oct. 14, 2013

(65) Prior Publication Data

US 2014/0103708 A1    Apr. 17, 2014

(30) Foreign Application Priority Data

Oct. 17, 2012 (JP) ................................. 2012-229803

(51) Int. Cl.
*H02J 7/02* (2016.01)
*H04B 15/00* (2006.01)
*H04B 15/04* (2006.01)

(52) U.S. Cl.
CPC ............. *H02J 7/025* (2013.01); *H04B 15/005* (2013.01); *H04B 15/04* (2013.01)

(58) Field of Classification Search
CPC .................................. H02J 7/025; H02J 5/005
USPC .................................................. 307/9.1, 104
See application file for complete search history.

(56) References Cited

FOREIGN PATENT DOCUMENTS

| DE | 10321842 B3 | 12/2004 |
|---|---|---|
| JP | 2006-13945 | 1/2006 |
| JP | 2007-104868 | 4/2007 |
| JP | 2008-131812 | 6/2008 |
| JP | 2008-206297 | 9/2008 |
| JP | 2009-118073 | 5/2009 |
| KR | 20040072742 | 8/2004 |
| WO | 2012/127868 | 9/2012 |

OTHER PUBLICATIONS

Japanese Office Action dated May 20, 2014 with English Translation, 6 pages.
Chinese Office Action dated Apr. 23, 2015, Application No. 201310477289.1, partial English translation included, 7 pages.
European Search Report dated Mar. 27, 2014, Application No. 13187818.3, 4 pages.
Korean Office action filed in 10-2013-0121799 mailed Oct. 22, 2014.

*Primary Examiner* — Jung Kim
*Assistant Examiner* — James Evans
(74) *Attorney, Agent, or Firm* — Rankin, Hill & Clark LLP

(57) ABSTRACT

An electric power transmission apparatus for a vehicle includes: a radio receiver that is capable of receiving a radio wave of a predetermined frequency transmitted from outside of the vehicle, and that is capable of executing a search operation of searching for the radio wave by shifting reception frequency from a current reception frequency at a predetermined shift speed, and stopping shifting of the reception frequency when a radio wave is received at or above a predetermined receiving intensity; and an on-vehicle device that interrupts transmission of the electric power to a mobile device performed by an electric power transmitter while the radio receiver is executing the search operation.

5 Claims, 6 Drawing Sheets

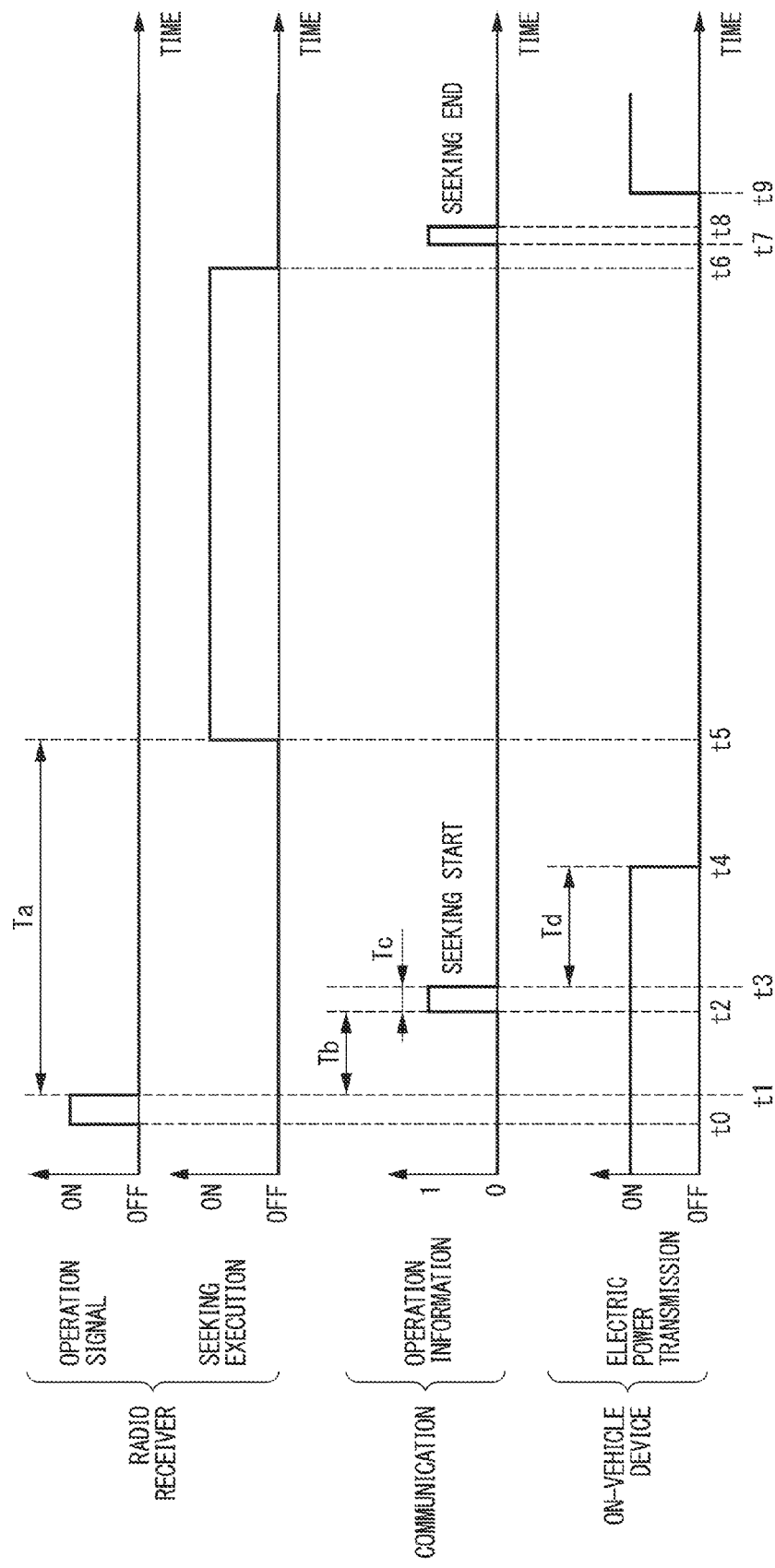

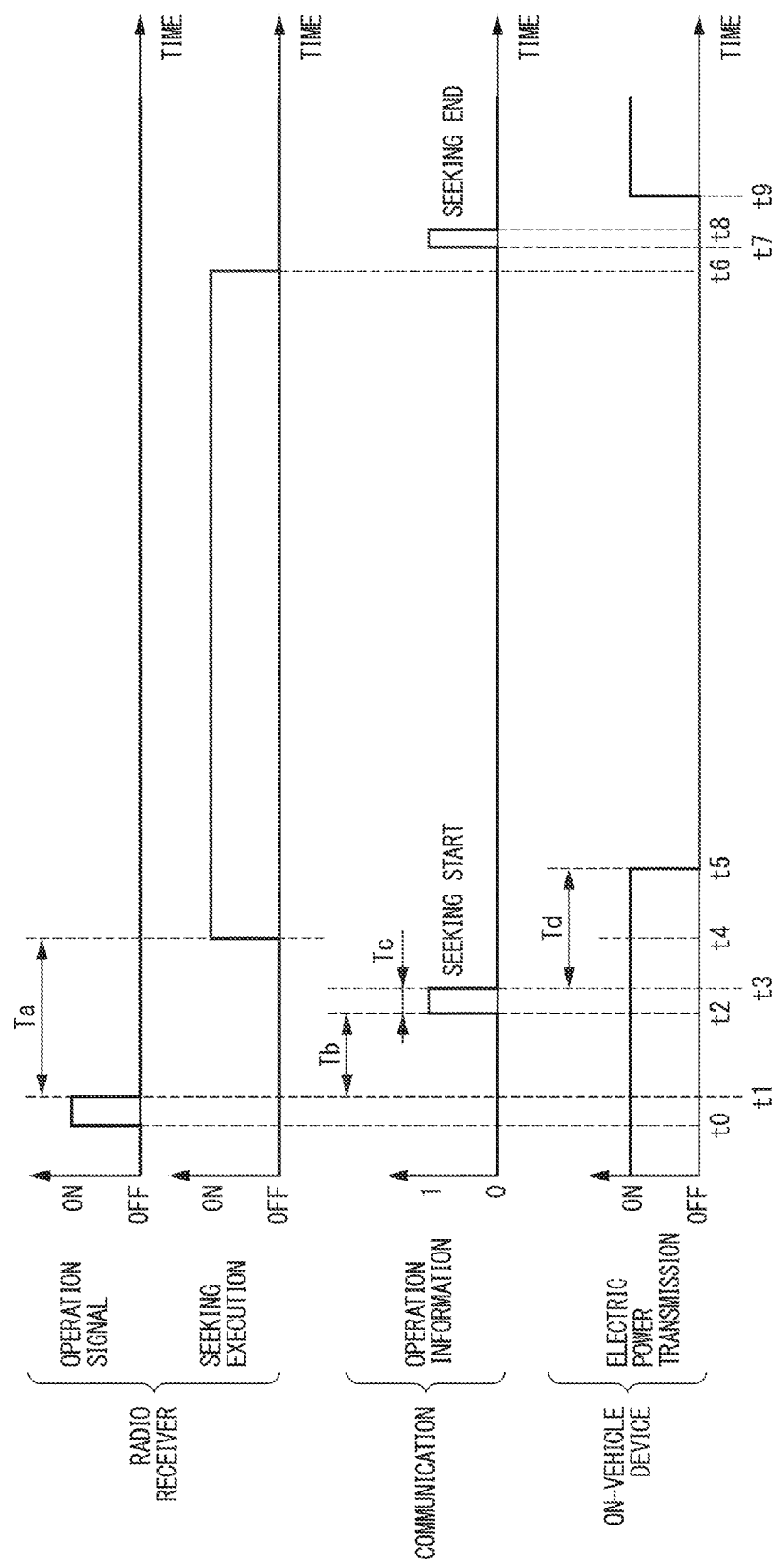

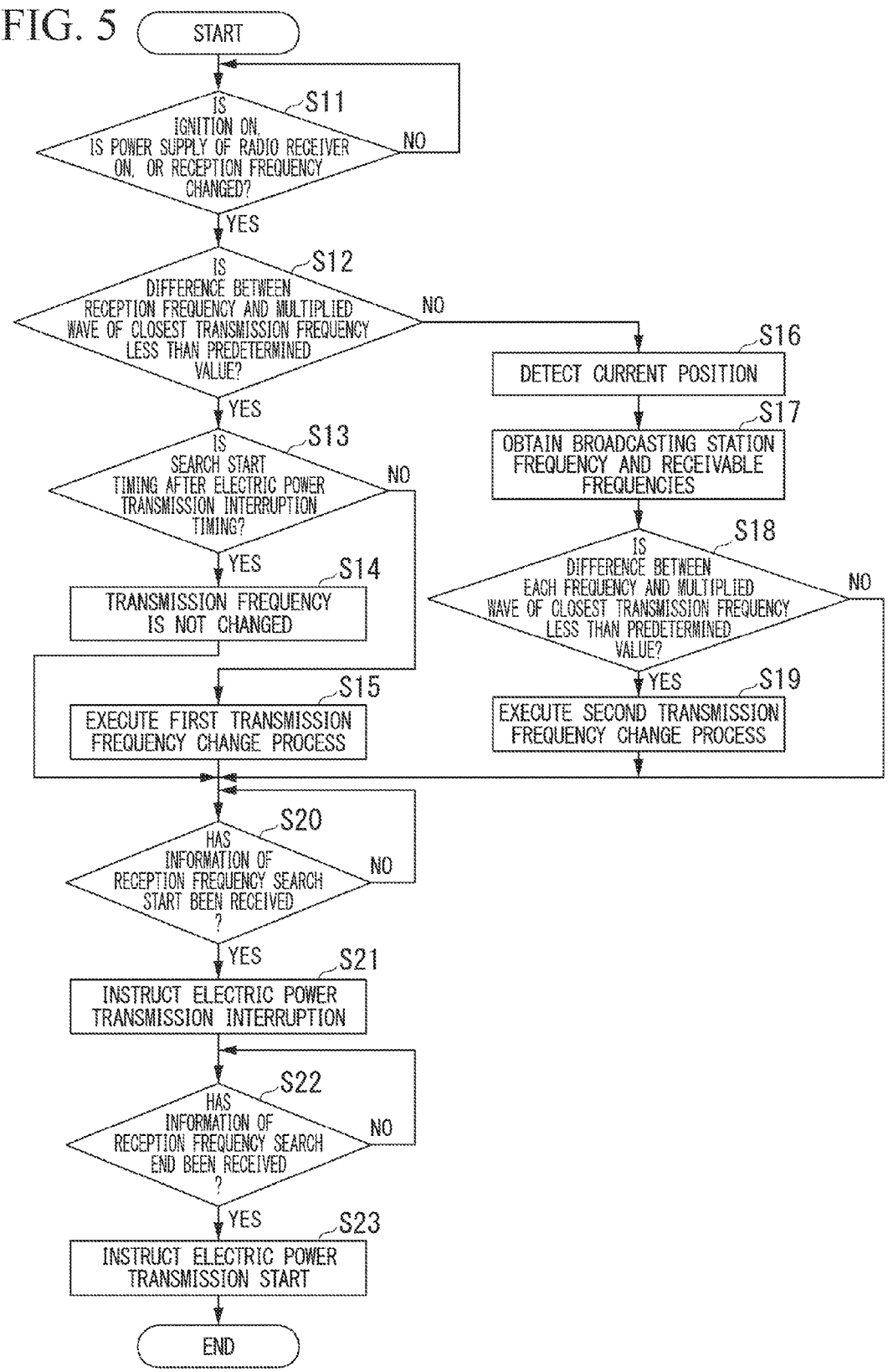

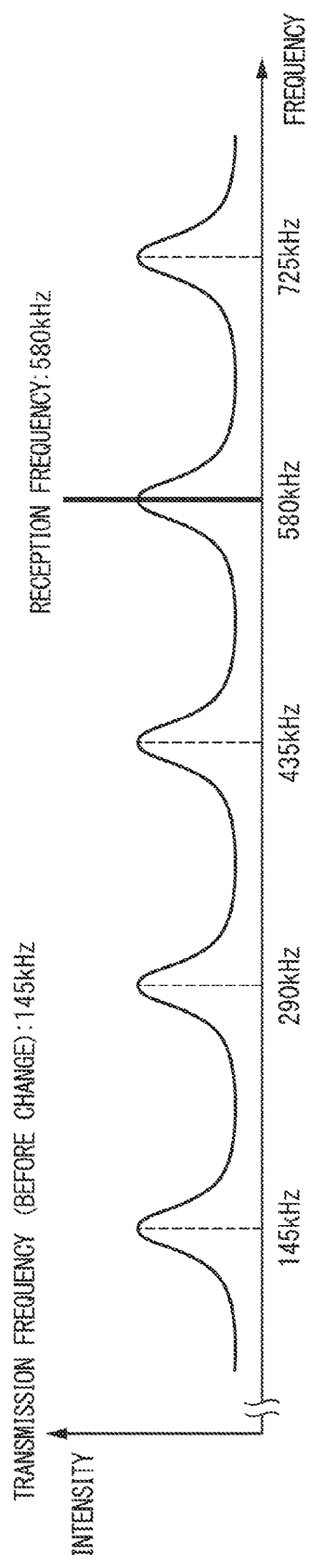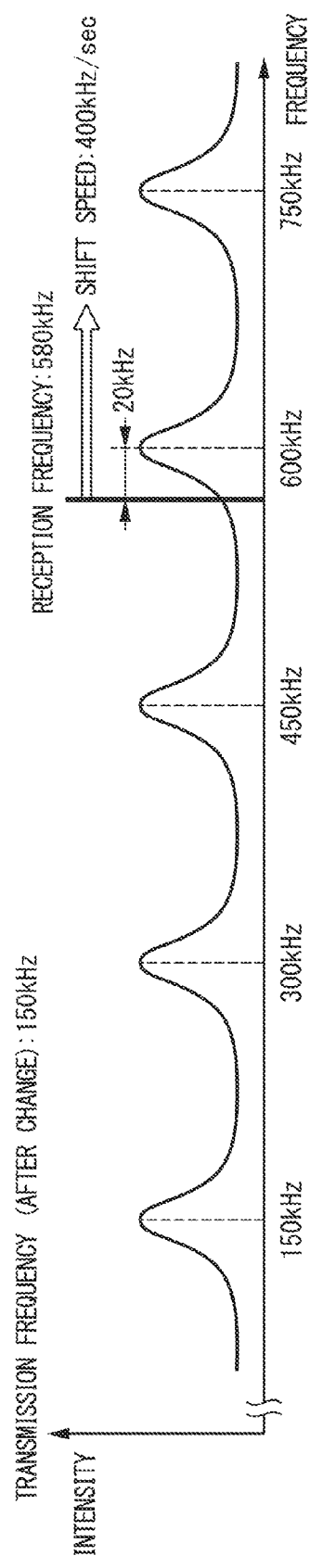

ELECTRIC POWER TRANSMISSION APPARATUS FOR VEHICLE

CROSS-REFERENCE TO RELATED APPLICATION

Priority is claimed on Japanese Patent Application No. 2012-229803, filed Oct. 17, 2012, the contents of which are incorporated herein by reference.

BACKGROUND

Technical Field

The present invention relates to an electric power transmission apparatus for a vehicle.

Background Art

Heretofore, there has been known a contactless charging system for a vehicle, for example, capable of charging a mobile phone contactlessly by mounting the mobile phone on a mount base inside a vehicle cabin (for example, refer to Japanese Unexamined Patent Application, First Publication No. 2007-104868).

SUMMARY

According to the contactless charging system for a vehicle of the above conventional technique, there is a possibility that electromagnetic waves emitted from a coil provided in the mount base, may interfere with other on-vehicle devices when charging is being performed.

For example, in the case of performing an operation of searching for a broadcasting station by automatically changing radio frequency on an on-vehicle radio receiver (a so-called scanning operation), there is a problem in that the operation of searching for a broadcasting station may be unintentionally stopped if a frequency multiplied wave of the electromagnetic wave emitted from the coil is received.

An aspect of the present invention takes into consideration the above circumstances, with an object of providing an electric power transmission apparatus for a vehicle capable of suppressing interference with frequency search operations of a radio wave receiver when performing contactless electric power transmission by transmitting electromagnetic waves.

The aspect of the present invention employs the following measures in order to solve the above problems and achieve the object.

(1) An electric power transmission apparatus for a vehicle of an aspect of the present invention is an electric power transmission apparatus for a vehicle provided in a vehicle, that transmits electric power to a mobile device furnished with an electric power receiving device, wherein there are provided: an electric power transmission device that transmits an electromagnetic wave of a predetermined transmission frequency to the mobile device to thereby transmit electric power to the electric power receiving device of the mobile device; a receiver that is capable of receiving a radio wave of a predetermined frequency transmitted from outside of the vehicle, and that is capable of executing a search operation that searches for the radio wave by shifting reception frequency from a current reception frequency at a predetermined shift speed, and that stops shifting of the reception frequency when a radio wave is received at or above a predetermined receiving intensity; and an interrupting device that interrupts transmission of the electric power performed by the electric power transmission device while the receiver is executing the search operation.

(2) In the aspect of (1) above, there is provided a frequency changing device that changes the transmission frequency by a predetermined amount in the case where a difference between the current reception frequency and the frequency of a multiplied wave of the transmission frequency that is closest to the reception frequency is less than a predetermined value.

(3) In the aspect of (2) above, there is provided an operation device that can be operated by a passenger of the vehicle; and the receiver starts shifting the reception frequency in the search operation when the operation is detected as being performed on the operation device; and the frequency changing device changes the transmission frequency by the predetermined amount, so that a period of time taken by the transmission frequency to shift, at the shift speed in the search operation, from the current reception frequency to a frequency of the multiplied wave of the transmission frequency that is closest to the reception frequency, is longer than a period of time taken from the moment where the receiver starts to shift the reception frequency according to the operation performed on the operation device, to the moment where the interrupting device interrupts transmission of the electric power.

(4) In the aspect of either one of (2) and (3) above, there are provided: an area determination device that detects a current position of the vehicle, and that determines an area based on the current position; and a memory device that preliminarily stores a frequency of the radio wave that can be received by the receiver, so as to correspond to each area. Further, the frequency changing device changes the transmission frequency by a predetermined amount in the case where a difference between a frequency of the radio wave that can be received in the area stored in the memory device, and a multiplied wave frequency of the transmission frequency that is closest to the radio wave frequency, is less than a predetermined value.

(5) In the aspect of any one of (2) through (4) above, there is provided a predetermined frequency memory device that can store a plurality of the predetermined frequencies; and the frequency changing device changes the transmission frequency by a predetermined amount in the case where a difference between the predetermined frequency stored in the predetermined frequency memory device, and a multiplied wave frequency of the transmission frequency that is closest to the predetermined frequency, is less than a predetermined value.

(6) In the aspect of any one of (1) through (5) above, the predetermined frequency is a frequency unique to a broadcasting station outside the vehicle, for modulating and transmitting audio signals or video signals as the radio wave from the broadcasting station.

According to the aspect of (1) above, transmission of electric power is interrupted while the receiver is executing a search operation, and it is therefore possible to prevent electromagnetic waves used in electric power transmission from interfering with the search operation of the receiver. Accordingly, it is possible to prevent a radio wave search operation performed by the receiver from being stopped, for example, as a result of the receiver wrongly detecting an electromagnetic wave used in electric power transmission as being a required radio wave. As a result, it is possible to ensure a desired level of usability and functionality in the receiver.

In the case of (2) above, when the multiplied wave frequency of the transmission frequency is in close proximity to the current reception frequency of the receiver (for example when the difference is less than the predetermined value), it is possible to suppress interference of the electromagnetic wave with respect to the receiving operation of the receiver, by changing the transmission frequency by the predetermined amount.

As a result, for example, even in the case where the transmission frequency and the multiplied wave of the transmission frequency have an appropriate spectrum width, it is possible to further reduce the influence of the transmission frequency of the electromagnetic wave used in electric power transmission, on the current reception frequency of the receiver.

In the case of (3) above, when an operation is detected as being performed on the operation device, if the timing of an electric power transmission interruption performed by the interrupting device is earlier than the start timing of reception frequency shifting in the search operation performed by the receiver, then for example, interference according to the difference between the current reception frequency and the multiplied wave frequency of the transmission frequency (that is, interference of an electromagnetic wave with the receiving operation of the receiver) does not occur.

On the other hand, when an operation is detected as being performed on the operation device, if the timing of an electric power transmission interruption performed by the interrupting device is later than the start timing of reception frequency shifting in the search operation performed by the receiver, there is a possibility that interference may occur. In this case, if a period of time taken by the transmission frequency to shift from the current reception frequency to a multiplied wave frequency of the closest transmission frequency, is longer than a period of time taken from the moment where the reception frequency starts to shift, to the moment where transmission of electric power is interrupted, electromagnetic wave interference with the receiving operation of the receiver is suppressed.

Therefore, by changing the transmission frequency by the predetermined amount so that electric power transmission is interrupted before shifting of the reception frequency performed by the receiver reaches the multiplied wave frequency of the transmission frequency that is closest to the current reception frequency, it is possible to suppress interference of the electromagnetic wave with respect to the receiving operation of the receiver regardless of the current reception frequency and without purposely having to delay the start timing of shifting of the reception frequency.

In the case of (4) above, by only once changing the transmission frequency by the predetermined amount for all radio wave frequencies that can be received by the receiver within an area including the current position of the vehicle, it is possible to suppress electromagnetic wave interference with respect to the receiving operation of the receiver, provided that the vehicle is present within this area. As a result, it is possible to easily ensure a desired level of transmission efficiency without having to frequently change the transmission frequency.

In the case of (5) above, by only once changing the transmission frequency by the predetermined amount for the plurality of predetermined frequencies stored in the predetermined frequency memory device such as a preset memory, it is possible to suppress electromagnetic wave interference with respect to the receiving operation of the receiver. As a result, it is possible to easily ensure a desired level of transmission efficiency without having to frequently change the transmission frequency.

In the case of (6) above, it is possible to prevent electromagnetic waves used in electric power transmission from interfering with a search operation of the receiver that receives a radio wave of a predetermined frequency unique to a broadcasting station.

BRIEF DESCRIPTION OF THE DRAWINGS

FIG. 3 is a diagram showing an example of; operation signals, whether or not a search operation is being executed, operation information of the search operation, and whether or not electric power transmission is being executed, of the electric power transmission apparatus for a vehicle according to the embodiment of the present invention.

FIG. 4 is a diagram showing an example of; operation signals, whether or not a search operation is being executed, operation information of the search operation, and whether or not electric power transmission is being executed, of the electric power transmission apparatus for a vehicle according to the embodiment of the present invention.

FIG. 5 is a flow chart showing operations of an on-vehicle device of the electric power transmission apparatus for a vehicle according to the embodiment of the present invention.

FIG. 6A is a diagram showing an example of transmission frequencies (before change) of the electric power transmission apparatus for a vehicle according to the embodiment of the present invention.

FIG. 6B is a diagram showing an example of transmission frequencies (after change) of the electric power transmission apparatus for a vehicle according to the embodiment of the present invention.

DESCRIPTION OF THE EMBODIMENT

Hereunder, an electric power transmission apparatus for a vehicle according to an embodiment of the present invention is described, with reference to the accompanying drawings.

An electric power transmission apparatus for a vehicle 10 of the present embodiment is for example, mounted on a vehicle, and is for suppressing electromagnetic wave interference with respect to receiving operations of a radio receiver 11 (receiver) when transmitting electric power to a mobile device 1 which is made portable to be carried by a passenger of the vehicle.

Figure 1:
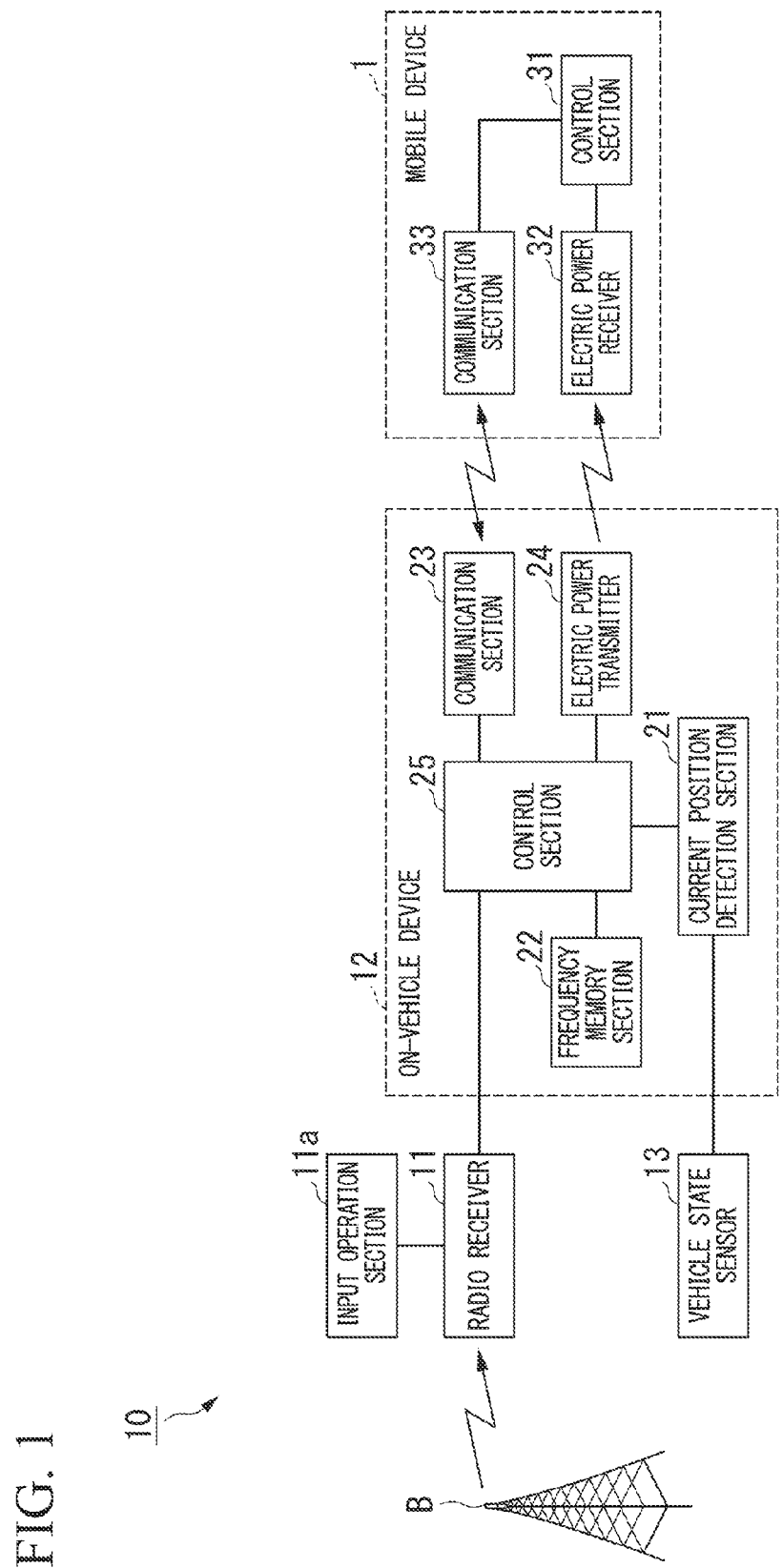
FIG. 1 is a block diagram of an electric power transmission apparatus for a vehicle according to an embodiment of the present invention.

For example, as shown in FIG. 1, the electric power transmission apparatus for a vehicle 10 is provided with; a radio receiver 11, an on-vehicle device 12, and a vehicle state sensor 13.

The radio receiver 11 is for example, capable of receiving radio waves of a predetermined frequency transmitted from a broadcasting station B outside the vehicle.

The predetermined frequency is a frequency that is unique to the broadcasting station B, for modulating and transmitting audio signals or video signals from the broadcasting station B outside the vehicle. It is a frequency of a radio wave that can be received by the radio receiver 11 within a predetermined area including the current position of the vehicle.

The radio receiver 11 may be configured to be capable of communicating with the on-vehicle device 12 by means of wireless communication, for example, in a state of being preliminarily mounted on the vehicle as with the on-vehicle device 12.

Moreover, the radio receiver 11 may be configured to be capable of communicating with the on-vehicle device 12 by means of wireless communication, for example, in a state of being newly mounted on the vehicle, being carried into the vehicle cabin by a vehicle passenger, or being present within a predetermined range of the periphery of the vehicle.

The radio receiver 11 is provided, for example, with an input operation section 11a (operation device) that can be operated by an operator.

The input operation section 11a is for example a button, a switch, or a touch panel that can be operated with a finger input of the operator, or for example a voice input device that can be operated with a voice input of the operator. It detects whether or not an input of a predetermined operation has been performed by the operator, and outputs an operation signal that indicates the result of this detection.

For example, the input operation section 11a outputs an operation signal according to an operation that instructs an execution start or an execution end of a reception frequency search operation for seeking or scanning of the radio receiver 11.

For example, when an operation signal that indicates an execution start of a reception frequency search operation is received from the input operation section 11a, the radio receiver 11 outputs information of the search start, which is operation information of the search operation, and information of the current reception frequency.

For example, when an operation signal that indicates an execution end of a reception frequency search operation is received from the input operation section 11a, the radio receiver 11 outputs information of the search end, which is operation information of the search operation.

For example, seeking is an operation to search for a next receivable radio wave on the lower frequency side or on the higher frequency side of the current reception frequency (for example, a radio wave at or above a predetermined reception intensity), by shifting the reception frequency of the radio receiver 11 at a predetermined shift speed from the current reception frequency.

For example, in the case of searching, at the time of executing seeking, for a next receivable radio wave on the lower frequency side or on the higher frequency side of the current reception frequency (for example, a radio wave at or above a predetermined reception intensity), or in the case where a predetermined upper limit frequency or a predetermined lower limit frequency has been reached, the radio receiver 11 outputs information that indicates the search end and ends the execution of seeking.

Moreover, for example, scanning is an operation to switch at predetermined intervals and receive receivable radio waves (for example, radio waves at or above a predetermined reception intensity) in a frequency ascending order or in a frequency descending order from the current reception frequency, by shifting the reception frequency of the radio receiver 11 at a predetermined shift speed from the current reception frequency.

For example, when an operation signal that indicates the execution end of the search operation is received from the input operation section 11a at the time of scanning execution, or when a predetermined upper limit frequency or a predetermined lower limit frequency has been reached, the radio receiver 11 outputs information that indicates the search end and ends the scanning execution.

The length of time between a timing where the radio receiver 11 outputs search start information and a timing where a search operation actually starts (search start timing) may be preliminarily stored in the on-vehicle device 12, and information of the timing where a search operation actually starts (search start timing) may be output from the radio receiver 11 and received by the on-vehicle device 12.

The on-vehicle device 12 is capable of performing wireless communication with the mobile device 1, and is also capable of performing wired or wireless communication with the radio receiver 11.

For example, the on-vehicle device 12 is provided with; a current position detection section 21 (area determination device), a frequency memory section 22 (memory device, predetermined frequency memory device), a communication section 23, an electric power transmitter 24 (electric power transmission device), and a control section 25 (interrupting device, frequency changing device, area determination device).

The current position detection section 21, receives for example a positioning signal such as a GPS (global positioning system) signal for measuring a position of the vehicle with use of satellites, and detects a current position of the vehicle based on this positioning signal. Furthermore, the current position detection section 21 can also use in combination, an autonomous navigation computation process based on speed and yaw rate of the vehicle, to detect a current position of the vehicle.

The frequency memory section 22 is for example, a preset memory or the like. It preliminarily stores a plurality of predetermined frequencies of radio waves that are transmitted from outside of the vehicle and that can be received by the radio receiver 11.

For example, the frequency memory section 22 preliminarily stores radio wave frequencies that can be received by the radio receiver 11 (such as the frequency unique to the broadcasting station B) in a manner such that the frequencies are associated with each preliminarily set predetermined area (for example, the broadcasting area of the broadcasting station B).

The communication section 23 is for example, capable of performing wireless communication with the mobile device 1, and it transmits and receives various types of information.

For example, the electric power transmitter 24 transmits an electromagnetic wave of a microwave converted from an electric current by an antenna (not shown in the figure) according to control of the control section 25, and with this electromagnetic wave being converted into an electric current by the antenna (not shown in the figure) of the mobile device 1, it transmits electric power to the mobile device 1.

The electric power transmitter 24 for example, preliminarily stores transmission characteristic information according to the transmission frequency of electromagnetic wave.

For example, according to the control of the control section 25, the electric power transmitter 24 changes the transmission frequency of the electromagnetic wave, and increases the electric power transmission of the electromagnetic wave according to the amount of change in the transmission frequency. Further, it is set based on the preliminarily stored transmission characteristic information, so that the amounts of electric power received by the mobile device 1 before and after the change in the transmission frequency become substantially the same.

The control section 25 outputs for example, a command signal that instructs operations of the communication section 23 and the electric power transmitter 24.

The control section 25, for example through communication with the radio receiver 11, is capable of obtaining; each information of a search start and a search end of a reception frequency, and information of a current reception frequency.

For example, when executing electric power transmission to the mobile device 1 with the electric power transmitter 24, the control section 25 instructs the electric power transmitter 24 to transmit an electromagnetic wave of a transmission frequency within a preliminarily set predetermined allowable frequency range, to the mobile device 1.

The predetermined allowable frequency range is set for example, according to the characteristics of the mobile device 1 and the electric power transmitter 24.

For example, when executing electric power transmission to the mobile device 1 with the electric power transmitter 24, then based on the information of the search start obtained from the radio receiver 11, the control section 25 instructs the electric power transmitter 24 to interrupt electric power transmission to the mobile device 1 performed by the electric power transmitter 24, while the radio receiver 11 is executing the reception frequency search operation.

For example, based on; the current reception frequency obtained from the radio receiver 11 and each frequency stored in the frequency memory section 22, and on the transmission frequency of the electromagnetic wave transmitted from the electric power transmitter 24 to the mobile device 1, the control section 25 instructs the electric power transmitter 24 to change the transmission frequency of the electromagnetic wave to be transmitted from the electric power transmitter 24 to the mobile device 1.

To describe in more detail, for example in the case where the difference between the current reception frequency of the radio receiver 11 and the multiplied wave frequency of the transmission frequency that is closest to this reception frequency is less than a predetermined value, the control section 25 instructs the electric power transmitter 24 to change the transmission frequency by a predetermined amount.

In this case, for example the control section 25 instructs the electric power transmitter 24 to change the transmission frequency by the predetermined amount, so that a period of time taken by the transmission frequency to shift at the shift speed in the search operation of the radio receiver 11, from the current reception frequency to a frequency of the multiplied wave of the transmission frequency that is closest to the reception frequency, is longer than a period of time taken from the moment where the radio receiver 11 starts to shift the reception frequency according to the predetermined operation performed by the operator on the input operation section 11a, to the moment where the electric power transmitter 24 interrupts electric power transmission.

Furthermore, for example according to the amount of change in the transmission frequency, the control section 25 instructs the electric power transmitter 24 to increase and/or decrease the amount of electric power transmission of the electromagnetic wave, so that the amounts of electric power received by the mobile device 1 before and after the change in the transmission frequency become substantially the same.

The predetermined value for the difference between the current reception frequency and the multiplied wave frequency of the closest transmission frequency, is set as a frequency difference for avoiding false detection in the reception frequency search operation.

This frequency difference is set for example according to; the characteristic of the radio receiver 11, the characteristic of the on-vehicle device 12, and the characteristic of a communication system such as CAN (controller area network) communication of the vehicle.

Furthermore for example, based on the current vehicle position detected by the current position detection section 21, the control section 25 determines in which one of a plurality of preliminarily set predetermined areas (for example, the broadcasting area of the broadcasting station B) the current vehicle position is included.

Then for example, the control section 25 obtains from the frequency memory section 22, the frequency of radio waves that can be received by the radio receiver 11 in the area that has been determined as including the vehicle current position. Then for example, in the case where the difference between the obtained frequency and the multiplied wave frequency of the transmission frequency that is closest to the obtained frequency is less than a predetermined value, the control section 25 instructs the electric power transmitter 24 to change the transmission frequency by a predetermined amount.

The vehicle state sensor 13 is provided for example with; a vehicle speed sensor that detects the speed of the driver's vehicle (vehicle speed) based on wheel speed of the driver's vehicle, and a yaw rate sensor that detects a yaw rate of the driver's vehicle, and it outputs signals for the respective detection results.

The mobile device 1 can wirelessly communicate with the on-vehicle device 12, and can contactlessly receive electric power feed from the on-vehicle device 12. For example, it is provided with a control section 31, an electric power receiver 32 (electric power receiving device), and a communication section 33.

The control section 31 outputs a command signal that instructs operations of the electric power receiver 32 and the communication section 33.

For example, according to control of the control section 31, the electric power receiver 32 converts microwaves received by an antenna (not shown in the figure) into an electric current to thereby obtain electric power.

The communication section 33 is for example, capable of performing wireless communication with the on-vehicle device 12, and it transmits and receives various types of information.

The electric power transmission apparatus for a vehicle 10 according to the present embodiment is provided with the above configuration. Next, operations of the electric power transmission apparatus for a vehicle 10 are described.

Hereunder, an operation of the radio receiver 11 is described first.

Figure 2:
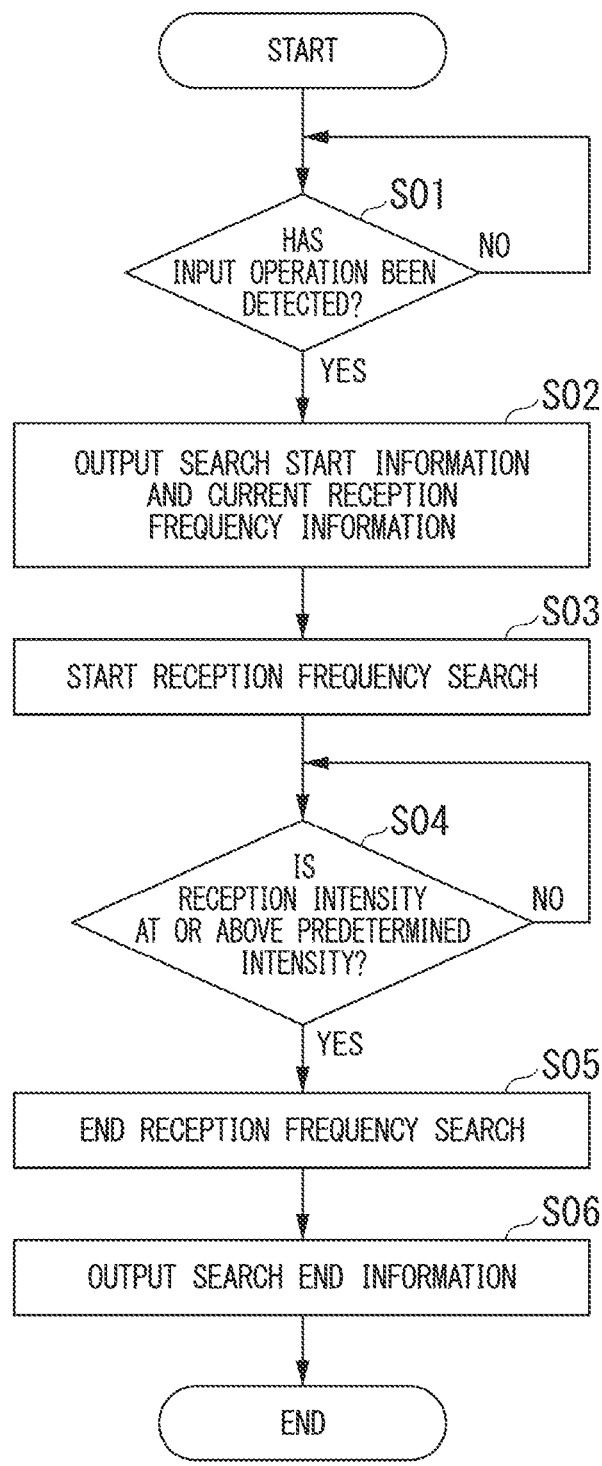
FIG. 2 is a flow chart showing operations of a radio receiver of the electric power transmission apparatus for a vehicle according to the embodiment of the present invention.

For example, in step S01 shown in FIG. 2, the input operation section 11a determines whether or not an input of a predetermined operation performed on the input operation section 11a by the operator has been detected.

If the result of this determination is "NO", the determination processing of step S01 is repeatedly executed.

On the other hand, if the result of this determination is "YES", the process proceeds to step S02.

For example, as shown in FIG. 3 or FIG. 4, the detection result of the input of the operator's predetermined operation made on the input operation section 11a is shown as an operation signal being ON during an appropriate length of time (for example, a length of time from time t0 to time t1).

Next, in step S02 there are output; information of a search start with respect to a reception frequency search operation such as seeking and scanning, and information of the current reception frequency.

For example, as shown in FIG. 3 or FIG. 4, the timing where the information of the search start (such as start of seeking) is output is a timing (for example, time t2) where a second predetermined time Tb according to the characteristic of the radio receiver 11 has elapsed from the moment (for example time t1) where the radio receiver 11 received the operation signal output from the input operation section 11a (that is, the operation signal that indicates an execution start of the reception frequency search operation).

Next, in step S03, the reception frequency search operation starts.

For example, as shown in FIG. 3 or FIG. 4, the timing where the reception frequency search operation starts is a timing (for example, time t5 in FIG. 3 or time t4 in FIG. 4) where a first predetermined time Ta according to the characteristic of the radio receiver 11 has elapsed from the moment (for example time t1) where the radio receiver 11 received the operation signal output from the input operation section 11a (that is, the operation signal that indicates an execution start of the reception frequency search operation).

Next, in step S04 it is determined whether or not the reception intensity of the radio wave is at or above a predetermined intensity.

If the result of this determination is "NO", the determination processing of step S04 is repeatedly executed.

On the other hand, if the result of this determination is "YES", the process proceeds to step S05.

Next, in step S05 the reception frequency search operation ends.

Next, in step S06 there is output information of a search end with respect to the reception frequency search operation such as seeking and scanning. Then, the process proceeds to END.

For example, as shown in FIG. 3 or FIG. 4, the timing where the information of the search end (such as end of seeking) is output is a timing (for example, timing between time t7 and time t8) where a predetermined time according to the characteristic of the radio receiver 11 has elapsed from the moment (for example time t6) where the reception frequency search operation ended.

Hereunder, an operation of the on-vehicle device 12 is described.

For example, in step S11 shown in FIG. 5 it is determined whether or not any one of the following actions has been executed, namely: an ignition switch that instructs activation of the vehicle has been turned ON; the power supply of the radio receiver 11 has been turned ON; and the reception frequency of the radio receiver 11 has been changed.

If the result of this determination is "NO", the determination processing of step S11 is repeatedly executed.

On the other hand, if the result of this determination is "YES", the process proceeds to step S12.

Next, in step S12 it is determined whether or not the difference between the current reception frequency, and the closest multiplied wave frequency to the current reception frequency among the multiplied wave frequencies of the transmission frequency of the electromagnetic wave transmitted from the electric power transmitter 24, is less than a predetermined value.

If the result of this determination is "NO", the process proceeds to step S16 described later.

On the other hand, if the result of this determination is "YES", the process proceeds to step S13.

Next, in step S13, it is determined whether or not the timing where the reception frequency search operation starts (search start timing) is after the timing where electric power transmission from the electric power transmitter 24 to the mobile device 1 is interrupted (electric power transmission interruption timing).

If the result of this determination is "YES" (for example, the state shown in FIG. 3), the process proceeds to step S14. In this step S14, the transmission frequency is not changed, and the process proceeds to step S20 described later.

If the result of this determination is "NO" (for example, the state shown in FIG. 4), the process proceeds to step S15. In this step S15, a first transmission frequency change process is executed, and the process proceeds to step S20 described later.

For example, as shown in FIG. 3 or FIG. 4, the electric power transmission interruption timing is a timing (for example, time t4 in FIG. 3 or time t5 in FIG. 4) where a fourth predetermined time Td according to the characteristic of the on-vehicle device 12 has elapsed from the moment (for example, time t3) where the on-vehicle device 12 received the information of the search start output from the radio receiver 11.

For example, as shown in FIG. 3 or FIG. 4, this electric power transmission interruption timing is a timing (for example, time t4 in FIG. 3 or time t5 in FIG. 4) where the second predetermined time Tb, the 3rd predetermined time Tc and the fourth predetermined time Td have elapsed from the moment (for example time t1) where the radio receiver 11 received the operation signal output from the input operation section 11a (that is, the operation signal that indicates the execution start of the reception frequency search operation).

For example, a third predetermined time Tc corresponds to an information transmission time according to the communication system such as the CAN (controller area network) communication of the vehicle.

Moreover, for example, the first transmission frequency change process changes the transmission frequency by a predetermined amount, so that a period of time taken by the transmission frequency to shift, at the shift speed in the search operation of the radio receiver 11, from the current reception frequency to a frequency of the multiplied wave of the change destination transmission frequency that is closest to the reception frequency, is longer than a period of time taken from the moment where the radio receiver 11 starts to shift the reception frequency according to the operation performed on the input operation section 11a, until the moment where the electric power transmitter 24 interrupts electric power transmission (that is, (Tb+Tc+Td)−Ta shown in FIG. 4).

Furthermore, in step S16, the current vehicle position is detected.

Next, in step S17, frequencies stored in the frequency memory section 22, such as several predetermined frequencies of radio waves that can be received by the radio receiver 11 within the area including the vehicle current position, and the frequency unique to the broadcasting station B, are obtained.

Next, in step S18 it is determined whether or not the difference between the frequency obtained from the frequency memory section 22, and the closest multiplied wave frequency to the frequency obtained from the frequency memory section 22 among the multiplied wave frequencies of the transmission frequency of the electromagnetic wave transmitted from the electric power transmitter 24, is less than a predetermined value.

If the result of this determination is "NO", the process proceeds to step S20 described later.

On the other hand, if the result of this determination is "YES", the process proceeds to step S19.

In step S19, a second transmission frequency change process is executed, and the process proceeds to step S20.

For example, the second transmission frequency change process is a process that changes the transmission frequency by a predetermined amount so as to avoid radio wave noise, and changes the current transmission frequency to a change destination transmission frequency on the ascending side or on the descending side where it does not approximate to a divisor of the frequency obtained from the frequency memory section 22.

To describe in more detail, for example, within predetermined allowable frequency ranges set before and after the current transmission frequency, the process changes the transmission frequency by the predetermined amount, so that the difference between the multiplied wave frequency of the change destination transmission frequency and the frequency obtained from the frequency memory section 22 becomes 1 channel interval (for example, 10 kHz) of the reception frequency.

In step S20, it is determined whether or not the information of the reception frequency search start has been received through the communication with the radio receiver 11.

If the result of this determination is "NO", the determination processing of step S20 is repeatedly executed.

On the other hand, if the result of this determination is "YES", the process proceeds to step S21.

In step S21, an instruction is issued to interrupt the electric power transmission from the electric power transmitter 24 to the mobile device 1.

In step S22, it is determined whether or not the information of the reception frequency search end has been received through the communication with the radio receiver 11.

If the result of this determination is "NO", the determination processing of step S22 is repeatedly executed.

On the other hand, if the result of this determination is "YES", the process proceeds to step S23.

In step S23, an instruction is issued to start (resume) the electric power transmission from the electric power transmitter 24 to the mobile device 1, and then the process proceeds to END.

For example, as shown in FIG. 6A, in the case where the reception frequency of the radio receiver 11 (for example, 580 kHz) and the multiplied wave frequency (for example, a frequency of multiple of four) of the current transmission frequency (for example, 145 kHz) are the same, an instruction is issued to change the transmission frequency by the predetermined amount.

Here, for example, as shown in FIG. 3, if $(Tb+Tc+Td) \leq Ta$ is satisfied, then the transmission frequency is not changed.

On the other hand, for example, as shown in FIG. 4, if $(Tb+Tc+Td) > Ta$ is satisfied, then the first transmission frequency change process changes the transmission frequency (pre-change frequency) (for example, 145 kHz) by the predetermined amount (for example, a value greater than +5 kHz) as shown in FIG. 6B for example.

For example, for the first predetermined time Ta (=30 ms), the second predetermined time Tb (=20 ms), the third predetermined time Tc (=20 ms), and the fourth predetermined time Td (=40 ms), ((Tb+Tc+Td)−Ta)=50 ms, and the electric power transmission is interrupted 50 ms after the reception frequency search operation starts.

On the other hand, if the predetermined amount is +5 kHz, the amount of time taken to shift at the shift speed (for example, 400 kHz/sec) in the search operation of the radio receiver 11 from the current reception frequency (for example, 580 kHz) to the multiplied wave frequency (for example, 600 kHz, which is a multiple of four) of the closest change destination transmission frequency (for example, 150 kHz) is 50 ms. This length of time matches the length of time taken from the moment where the reception frequency search operation starts to the moment where the electric power transmission is interrupted.

Therefore, the transmission frequency is changed by a predetermined amount value greater than +5 kHz (for example, +6 kHz), so that the length of time taken for the reception frequency of the radio receiver 11 to shift to the multiplied wave frequency of the closest change destination transmission frequency becomes longer than the length of time taken from the moment where the reception frequency search operation starts until the electric power transmission is interrupted.

As described above, according to the electric power transmission apparatus for a vehicle 10 of the present embodiment, electric power transmission from the on-vehicle device 12 to the mobile device 1 is interrupted while a reception frequency search operation of the radio receiver 11 such as seeking and scanning is being executed.

As a result, it is possible to prevent electromagnetic waves used for electric power transmission from interfering with the search operation of the radio receiver 11.

Furthermore, it is possible to prevent a radio wave search operation from being stopped, for example, as a result of the radio receiver 11 wrongly detecting an electromagnetic wave used in electric power transmission performed by the on-vehicle device 12 as being a required radio wave. As a result, it is possible to ensure a desired level of usability and functionality of the radio receiver 11.

Furthermore, when the multiplied wave frequency of the transmission frequency is in close proximity to the current reception frequency of the radio receiver 11 (for example when the difference is less than the predetermined value), it is possible to suppress interference of an electromagnetic wave with respect to the receiving operation of the radio receiver 11 by changing the transmission frequency by the predetermined amount.

As a result, for example, even in the case where the transmission frequency and the multiplied wave of the transmission frequency have an appropriate spectrum width, it is possible to further reduce the influence of the electromagnetic wave used in electric power transmission, on the receiving operation of the radio receiver 11, and radio wave noise can be avoided.

Furthermore, the transmission frequency is changed by the predetermined amount so that electric power transmission is interrupted before shifting of the reception frequency reaches the multiplied wave frequency of the closest transmission frequency from the current reception frequency, as a result of the search operation of the radio receiver 11.

As a result, regardless of the current reception frequency, it is possible to suppress interference of an electromagnetic wave with respect to the receiving operation of the radio receiver 11, and avoid false detection in the reception frequency search operation, without the need for purposely delaying the timing to start shifting the reception frequency.

Moreover, in the case where the frequency stored in the frequency memory section 22 is in close proximity to the multiplied wave frequency of the transmission frequency (for example, when the difference is less than the predetermined value), the transmission frequency is changed once only by the predetermined amount in the state where the vehicle is present within a predetermined area including the vehicle current position.

As a result, it is possible to suppress interference of an electromagnetic wave with respect to the receiving operation of the radio receiver 11 without the need for changing the transmission frequency again, and a desired level of transmission efficiency can be easily ensured.

In the embodiment described above, the electric power transmission apparatus for a vehicle 10 suppresses interference with the radio receiver 11. However, it is not limited to this, and it may suppress interference with another type of receiver such as a receiver for various types of terrestrial broadcasting or satellite broadcasting. In this case, the electric power transmission apparatus for a vehicle 10 is provided with another receiver instead of the radio receiver 11.

In the embodiment described above, the on-vehicle device 12 executes each transmission frequency change process when any one of the following actions is executed, namely: an ignition switch has been turned ON; the power supply of the radio receiver 11 has been turned ON; and the reception frequency of the radio receiver 11 has been changed. However, it is not limited to this, and the process of changing the transmission frequency may be executed at an appropriate timing, provided that the difference between the reception frequency of the radio receiver 11 or the frequency obtained from the frequency memory section 22, and the multiplied wave frequency of the closest transmission frequency is less than a predetermined value.

In the embodiment described above, as shown in step S12 through step S18, when the difference between the current reception frequency and the multiplied wave frequency of the closest transmission frequency is greater than or equal to a predetermined value, the on-vehicle device 12 determines whether or not the difference between the frequency stored in the frequency memory section 22 and the multiplied wave frequency of the closest transmission frequency is less than the predetermined value. However, it is not limited to this, and the determination process for the frequency stored in the frequency memory section 22 may be executed at an appropriate timing.

In the embodiment described above, in addition to the first and second transmission frequency change processes, there may be executed a process for changing the transmission frequency by a predetermined amount in order to avoid radio wave noise.

In this case, for example, the predetermined value with respect to the difference between the current reception frequency and the multiplied wave frequency of the closest transmission frequency is set to the greater of; a frequency difference for avoiding radio wave noise, and a frequency difference for avoiding false detection in a reception frequency search operation.

In the case where the difference between the current reception frequency of the radio receiver 11 and the multiplied wave frequency of the transmission frequency that is closest to this reception frequency is less than the predetermined value, the control section 25 instructs the electric power transmitter 24 to change the transmission frequency by the predetermined amount.

For example, the frequency difference for avoiding radio wave noise changes depending on; the type of antenna of the radio receiver 11, the layout of the antenna, the wiring between the antenna and the main body of the radio receiver 11, and the characteristic of the radio receiver 11, and it is set based on results of tests that are preliminarily carried out.

Moreover, for example, in order to avoid radio wave noise, the transmission frequency is changed by a predetermined amount, so that the difference between the multiplied wave frequency of the change destination transmission frequency and the reception frequency is not less than a 1 channel interval of the reception frequency (for example, 10 kHz).

In the embodiment, described above, the communication section 23 and the electric power transmitter 24 of the on-vehicle device 12 may be provided on another type of device, and may be configured as a single unit.

The technical scope of the present invention is not limited to the embodiment described above, and includes ones with various types of modifications made to the above embodiment without departing from the scope of the invention. That is to say, the configuration of the above embodiment is merely an example, and appropriate modifications may be made thereto.

What is claimed is:

1. An electric power transmission apparatus for a vehicle provided in a vehicle, that transmits electric power to a mobile device furnished with an electric power receiving device, wherein there are provided:
    an electric power transmission device that transmits an electromagnetic wave of a predetermined transmission frequency to the mobile device to thereby transmit electric power to the electric power receiving device of the mobile device;
    a receiver that is capable of receiving a radio wave of a predetermined frequency transmitted from outside of the vehicle, and that is capable of executing a search operation that searches for the radio wave by shifting reception frequency from a current reception frequency at a predetermined shift speed, and that stops shifting of the reception frequency when a radio wave is received at or above a predetermined receiving intensity; and
    an interrupting device that interrupts transmission of the electric power performed by the electric power transmission device while the receiver is executing the search operation,
    wherein there is provided a frequency changing device that changes the transmission frequency by a predetermined amount in the case where a difference between the current reception frequency and the frequency of a multiplied wave of the transmission frequency that is closest to the reception frequency is less than a predetermined value.

2. The electric power transmission apparatus for a vehicle according to claim 1, wherein there is provided an operation device that can be operated by a passenger of the vehicle;
    and the receiver starts shifting the reception frequency in the search operation when the operation is detected as being performed on the operation device; and
    the frequency changing device changes the transmission frequency by the predetermined amount, so that a period of time taken by the transmission frequency to shift, at the shift speed in the search operation, from the current reception frequency to a frequency of the multiplied wave of the transmission frequency that is closest to the reception frequency, is longer than a period of time taken from the moment where the receiver starts to shift the reception frequency according to the operation performed on the operation device, to the moment where the interrupting device interrupts transmission of the electric power.

3. The electric power transmission apparatus for a vehicle according to claim 1, wherein there are provided:

an area determination device that detects a current position of the vehicle, and that determines an area based on the current position; and a memory device that preliminarily stores a frequency of the radio wave that can be received by the receiver, so as to correspond to each area, and the frequency changing device changes the transmission frequency by a predetermined amount in the case where a difference between a frequency of the radio wave that can be received in the area stored in the memory device, and a multiplied wave frequency of the transmission frequency that is closest to the radio wave frequency, is less than a predetermined value.

4. The electric power transmission apparatus for a vehicle according to claim 1, wherein there is provided a predetermined frequency memory device that can store a plurality of the predetermined frequencies;

and the frequency changing device changes the transmission frequency by a predetermined amount in the case where a difference between the predetermined frequency stored in the predetermined frequency memory device, and a multiplied wave frequency of the transmission frequency that is closest to the predetermined frequency, is less than a predetermined value.

5. The electric power transmission apparatus for a vehicle according to claim 1, wherein the predetermined frequency is a frequency unique to a broadcasting station outside the vehicle, for modulating and transmitting audio signals or video signals as the radio wave from the broadcasting station.

* * * * *